United States Patent
Lee et al.

(10) Patent No.: US 10,190,542 B2
(45) Date of Patent: Jan. 29, 2019

(54) CANISTER CLOSE VALVE DEVICE

(71) Applicants: Hyundai Motor Company, Seoul (KR); Kia Motors Corporation, Seoul (KR)

(72) Inventors: Jin Ug Lee, Daegu (KR); Jung Su Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/798,156

(22) Filed: Oct. 30, 2017

(65) Prior Publication Data

US 2018/0313298 A1    Nov. 1, 2018

(30) Foreign Application Priority Data

Apr. 26, 2017   (KR) .................. 10-2017-0053737

(51) Int. Cl.
*F02M 25/08*     (2006.01)
*F16K 31/06*     (2006.01)

(52) U.S. Cl.
CPC ..... *F02M 25/0836* (2013.01); *F16K 31/0689* (2013.01); *F02M 2025/0845* (2013.01)

(58) Field of Classification Search
CPC ............... F02M 25/08; F02M 25/0836; F02M 2025/0845
See application file for complete search history.

(56) References Cited

U.S. PATENT DOCUMENTS

| 5,579,802 A | 12/1996 | Tuckey |
| 7,296,600 B2 | 11/2007 | Ferreira et al. |
| 9,873,320 B2 * | 1/2018 | Young .............. B60K 15/03519 |

FOREIGN PATENT DOCUMENTS

| JP | S 57-1878 A | 1/1982 |
| JP | S 58-50378 A | 3/1983 |
| KR | 20-1999-0011307 U | 3/1999 |
| KR | 10-2007-0005145 A | 1/2007 |
| KR | 10-1024298 B1 | 3/2011 |

* cited by examiner

*Primary Examiner* — Hieu T Vo
(74) *Attorney, Agent, or Firm* — Morgan, Lewis & Bockius LLP

(57) ABSTRACT

A canister close valve device for opening or closing a passage provided between a canister, which collects evaporation gas evaporated from a fuel tank and the atmosphere may include a plunger configured to selectively move up or down through magnetization with a core inside a valve housing when a solenoid is activated, a rod configured to perform a rectilinear reciprocating movement toward or away from the passage due to the upward/downward movement of the plunger, and a diaphragm valve body, which is inserted into the plunger, is connected to the valve housing, and is configured to be deformed by the upward/downward movement of the plunger and to generate force for impeding the upward/downward movement of the plunger using a pressure difference generated between the plunger and the valve housing.

7 Claims, 7 Drawing Sheets

CANISTER CLOSE VALVE DEVICE

CROSS-REFERENCE(S) TO RELATED APPLICATIONS

The present application claims priority to Korean Patent Application No. 10-2017-0053737, filed on Apr. 26, 2017, the entire contents of which is incorporated herein for all purposes by this reference.

BACKGROUND OF THE INVENTION

Field of the Invention

The present invention relates to a canister close valve device. More particularly, the present invention relates to a canister close valve device, which is configured for reducing a collision noise generated by an upward/downward movement of a plunger when the device is switched ON or OFF.

Description of Related Art

In general, fuel vapor evaporated from a fuel tank is temporarily stored in a canister, and is supplied to an intake system to be combusted when an engine is rotated. Here, a fuel tank pressure sensor (FTPS) configured for detecting a pressure of the fuel tank and a canister close valve (CCV) configured for maintaining the canister in an airtight state by closing a passage provided between a fuel system of a vehicle and an atmosphere are important factors in leakage monitoring to comply with regulations of fuel evaporation gas emission.

A system for preventing fuel evaporation gas emission collects hydrocarbons, which are included in fuel vapor evaporated from the fuel tank, in a canister in which activated carbon is stored. When the canister close valve is switched open, the collected hydrocarbons are released from the canister by the introduction of external air thereinto, flow into a combustion chamber via a purge control valve, a surge tank, and an intake manifold, then are combusted in the combustion chamber.

When fuel evaporation gas leaks due to damage to a fuel evaporation gas line, for example, a crack in the fuel evaporation gas line, air pollution increases. Therefore, in an event of leakage of fuel evaporation gas, it is determined that the system for preventing fuel evaporation gas emission is not operational, and a system warning light is turned ON, making a driver aware of such warning information. The present warning mechanism of the system for preventing fuel evaporation gas emission is referred to as leakage monitoring.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention the present invention are directed to providing a canister close valve device which is configured for reducing a collision noise using an airtight diaphragm structure, which generates a force for impeding a movement of a plunger using a pressure difference generated therefrom, in a manner of reducing a downwardly moving speed of the plunger at the moment at which a rod reaches a passage when the device is turned ON, or reducing an upwardly moving speed of the plunger at the moment at which the plunger reaches a cap when the device is turned OFF.

Various aspects of the present invention are directed to providing a canister close valve device configured for opening or closing a passage provided between a canister, which collects evaporation gas evaporated from a fuel tank and the atmosphere, the canister close valve device including a plunger configured to selectively move up or down through magnetization with a core inside a valve housing when a solenoid is activated, a rod configured to perform a rectilinear reciprocating movement toward or away from the passage due to an upward/downward movement of the plunger, and a diaphragm valve body, which is inserted into the plunger, is connected to the valve housing and is configured to be deformed by the upward/downward movement of the plunger and generates a force for impeding the upward/downward movement of the plunger using a pressure difference generated between the plunger and the valve housing.

In an exemplary embodiment of the present invention, the diaphragm valve body may include a non-deformable portion which is inserted into the plunger, has a predetermined height to increase a volume of an upper internal region of the valve housing, and has an orifice formed therein, and a deformable portion which is formed around a periphery of the non-deformable portion integrally therewith, is connected to an internal of the valve housing, and is configured to be deformed in accordance with an upward/downward movement of the non-deformable portion due to the upward/downward movement of the plunger.

In another exemplary embodiment of the present invention, the orifice may be formed to penetrate an end portion of the non-deformable portion which is inserted into the plunger.

In yet another exemplary embodiment of the present invention, the diaphragm valve body may further include an O-ring member disposed around the external peripheral surface of the non-deformable portion which is inserted into the plunger.

In yet another exemplary embodiment of the present invention, when the plunger moves downwards, the diaphragm valve body may generate a force for impeding the downward movement of the plunger using a pressure difference in a manner of allowing air in the plunger to flow into the valve housing through the orifice.

In still yet another exemplary embodiment of the present invention, when the plunger moves upwards, the diaphragm valve body may generate a force for impeding the upward movement of the plunger using a pressure difference in a manner of allowing air in the valve housing to flow into the plunger through the orifice.

In a further exemplary embodiment of the present invention, the diaphragm valve body may include an elastic rubber material.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a view illustrating an air flow due to a pressure difference when the canister close valve device according to the exemplary embodiment of the present invention is turned ON;

Figure 1A:
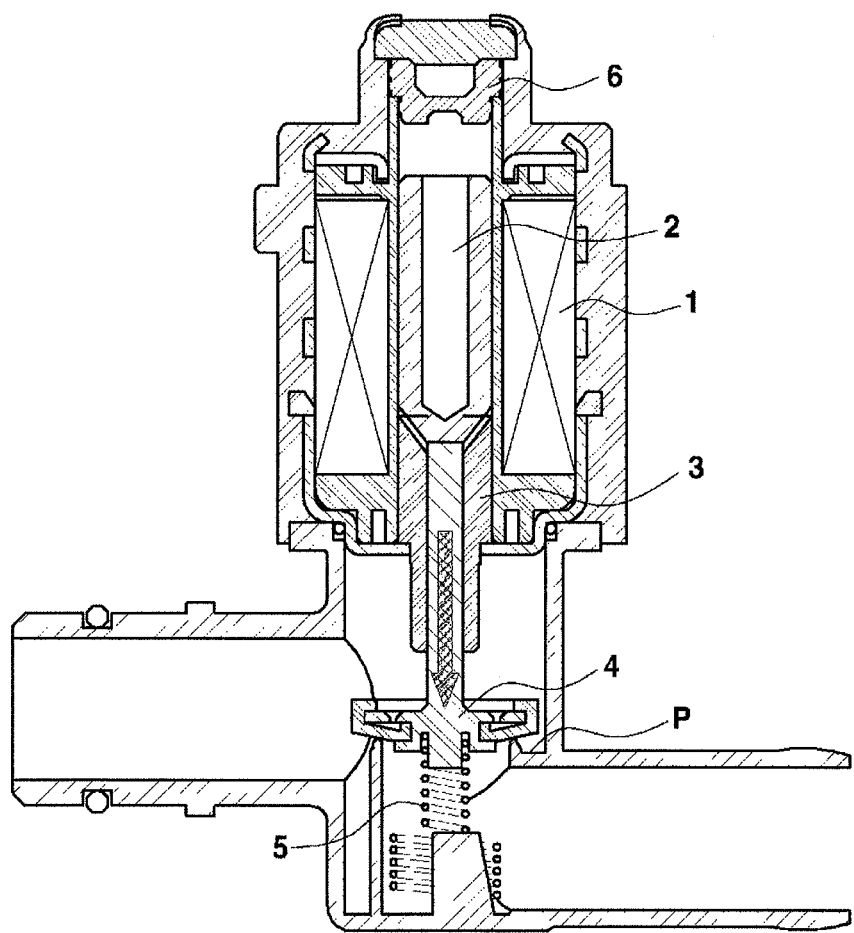
FIG. 1A is a view illustrating an ON state of a conventional canister close valve.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An operation of a conventional canister close valve will first be described for better understanding of the invention.

A canister close valve is disposed between a canister and a canister air filter, and is configured to selectively maintain a system for preventing fuel evaporation gas emission in an airtight state or a communicating state in a manner of closing or opening a passage provided between the canister and the atmosphere. In the canister close valve, as shown in FIG. 1A, when a voltage is applied to a solenoid 1, a plunger 2 and a core 3 are magnetized, and an attractive force is generated therebetween. The plunger 2 is moved toward the core 3 at a high speed by the attractive force, and accordingly, a rod 4, which is connected to the plunger 2, is moved downwards. At the present time, there occurs a problem in that collision noise is produced by friction between the rod 4, which moves at a high speed, and a passage P.

Figure 1B:
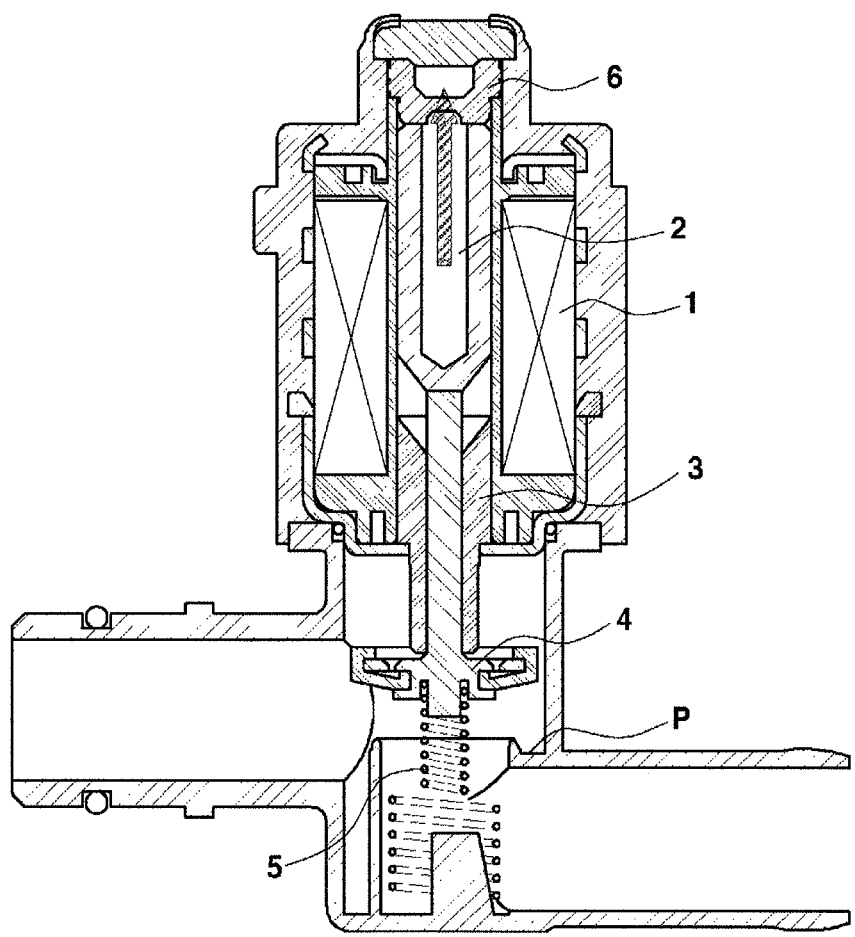
FIG. 1B is a view illustrating an OFF state of the conventional canister close valve.

Conversely, as shown in FIG. 1B, when the voltage applied to the solenoid 1 is removed, the attractive force acting on the plunger 2 and the core 3 disappears, and accordingly, the rod 4 is moved at a high speed by the force of a spring 5. At the same time, the plunger 2, which is connected to the rod 4, is also moved with the rod 4. Accordingly, there also occurs a problem in that collision noise is produced by friction between the plunger 2, which moves at a high speed, and a cap 6.

Therefore, it is important to reduce the collision noise in the canister close valve, which is produced in both an ON state, in which a voltage is applied to the solenoid and, an OFF state, in which the voltage is not applied to the solenoid.

Figure 2:
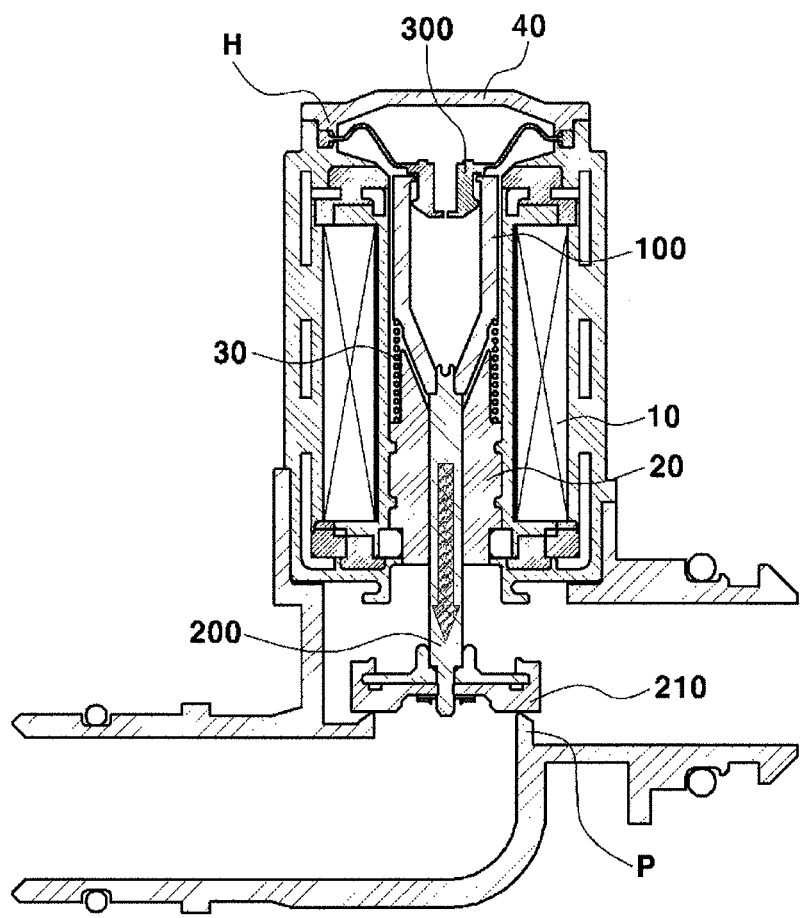
FIG. 2 is a view illustrating an ON state of a canister close valve device according to an exemplary embodiment of the present invention.
Figure 3A:
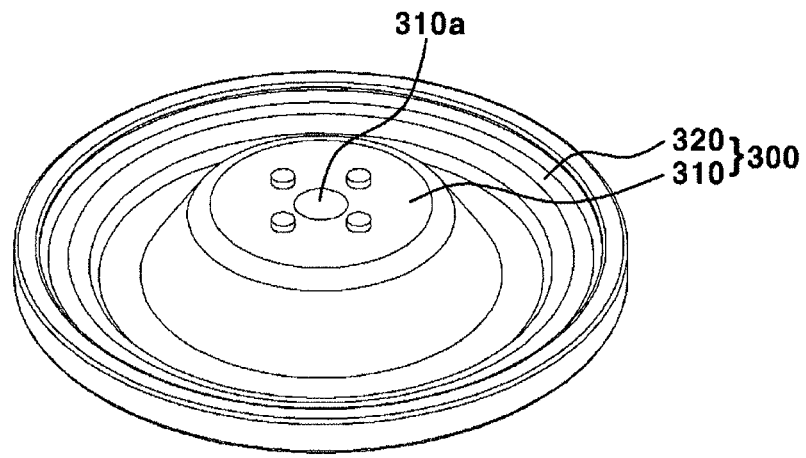
FIG. 3A and FIG. 3B are views illustrating a top surface and a bottom surface of a diaphragm valve body of the canister close valve device according to the exemplary embodiment of the present invention.
Figure 3B:
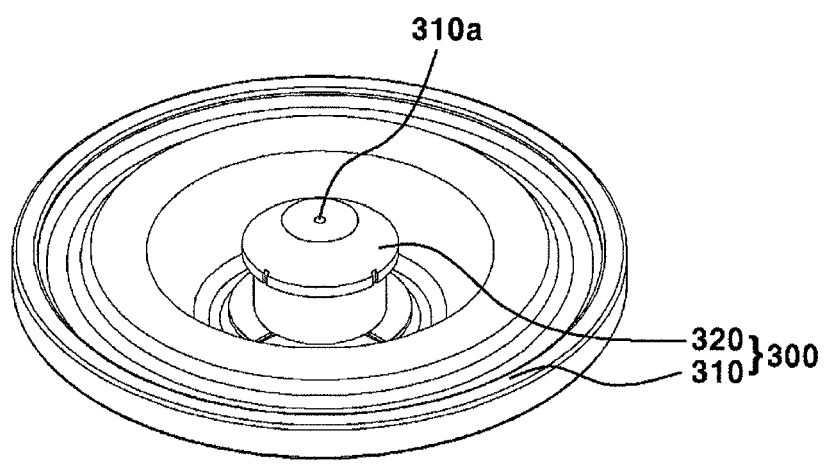
Figure 4:
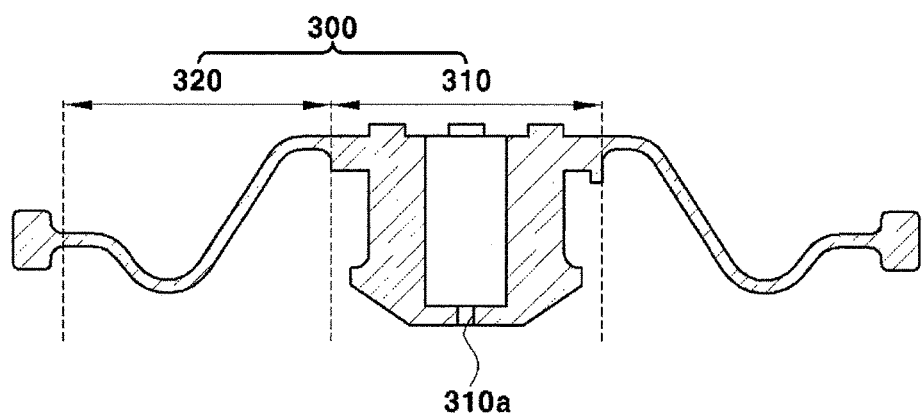
FIG. 4 is a view illustrating a cross section of the diaphragm valve body of the canister close valve device according to the exemplary embodiment of the present invention.

FIG. 2 is a view illustrating the ON state of a canister close valve device according to an exemplary embodiment of the present invention. FIG. 3A and FIG. 3B are views illustrating the top surface and the bottom surface of a diaphragm valve body of the canister close valve device according to the exemplary embodiment of the present invention. FIG. 4 is a view illustrating the cross section of the diaphragm valve body of the canister close valve device according to the exemplary embodiment of the present invention.

Figure 5:
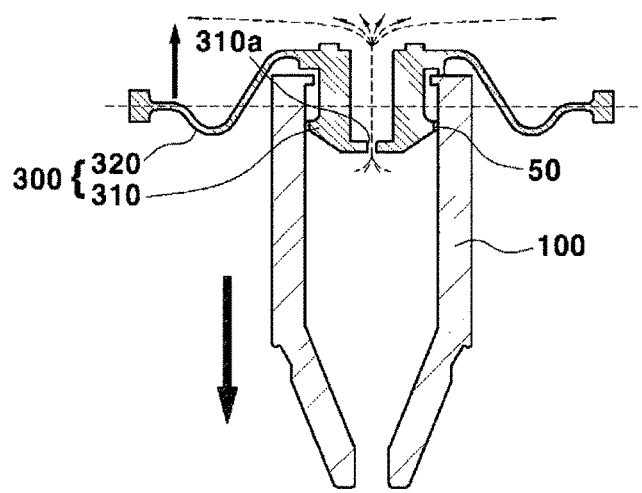
Figure 6:
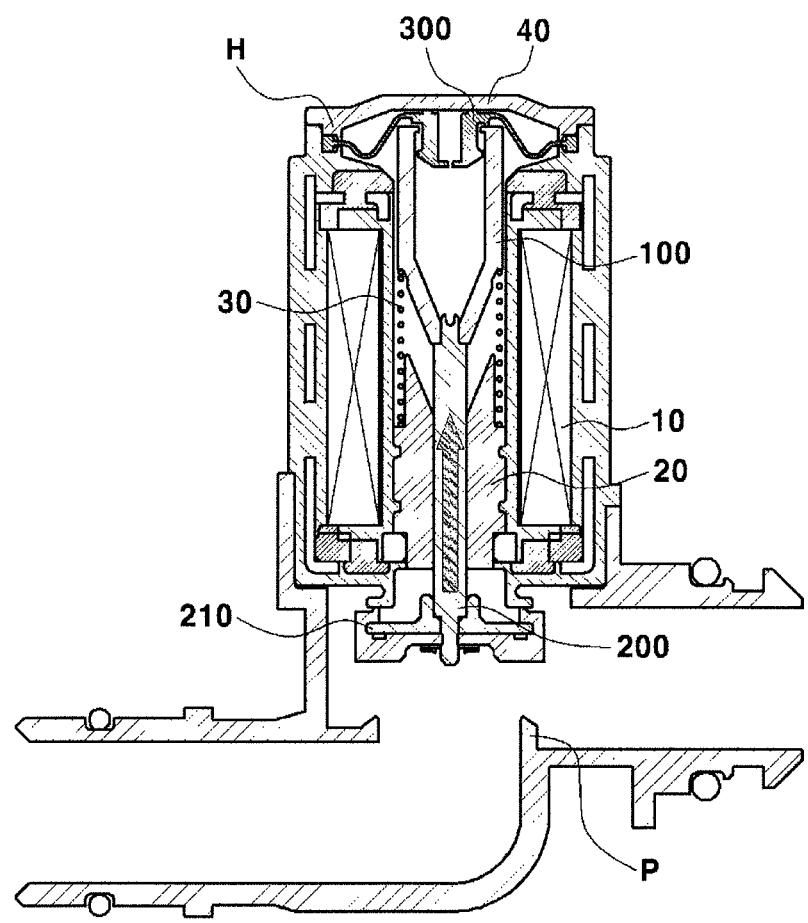
FIG. 6 is a view illustrating the OFF state of the canister close valve device according to the exemplary embodiment of the present invention.
Figure 7:
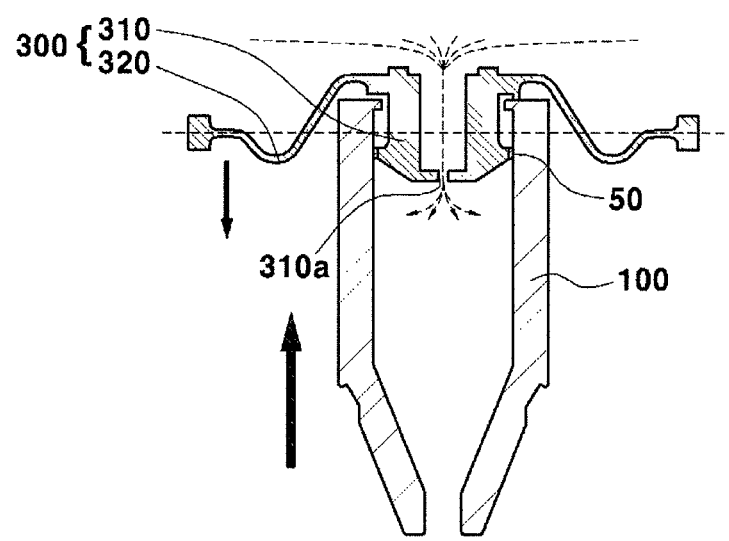
FIG. 7 is a view illustrating an air flow due to a pressure difference when the canister close valve device according to the exemplary embodiment of the present invention is turned OFF.

FIG. 5 is a view illustrating an air flow due to a pressure difference when the canister close valve device according to the exemplary embodiment of the present invention is turned ON. FIG. 6 is a view illustrating the OFF state of the canister close valve device according to the exemplary embodiment of the present invention. FIG. 7 is a view illustrating the air flow due to a pressure difference when the canister close valve device according to the exemplary embodiment of the present invention is turned OFF.

In general, the canister close valve is an important factor in leakage monitoring to comply with regulations on fuel evaporation gas emission.

To the present end, as shown in FIG. 2, the canister close valve device according to the exemplary embodiment of the present invention includes a plunger 100, a rod 200, and a diaphragm valve body 300, to open or close a passage P provided between a canister, which is configured to collect fuel evaporation gas evaporated from a fuel tank of a vehicle, and the atmosphere.

First, in accordance with activation of a solenoid 10, the plunger 100 selectively moves up or down through magnetization with a core 20.

The rod 200, which is connected to the plunger 100, also moves up or down together with the plunger 100, which moves up or down. Accordingly, the rod 200 performs rectilinear reciprocating movement toward or away from the passage P.

A restoring spring 30 is disposed between the plunger 100 and the core 20. The restoring spring 30 is configured to enable the plunger 100 to return from a lower-limit position to an upper-limit position (i.e. an original position) when the canister close valve device is switched from the ON state to the OFF state.

The diaphragm valve body 300 is inserted into the plunger 100, and is connected to a valve housing H. The diaphragm valve body 300 is configured to be deformed in accordance with an upward/downward movement of the plunger 100.

The diaphragm valve body 300 generates a force that impedes the upward/downward movement of the plunger 100 using a pressure difference generated between the internal region of the plunger 100 and the internal region of the valve housing H.

The diaphragm valve body 300, as shown in FIG. 3A, FIG. 3B, and FIG. 4, includes a non-deformable portion 310, which is formed at a center thereof, and a deformable portion 320, which is formed around a periphery of the non-deformable portion 310 integrally therewith.

The non-deformable portion 310 is formed in a shape of a column having a predetermined height, and is inserted into the plunger 100.

The non-deformable portion 310 has an empty internal region therein, and has an orifice 310a formed in an end portion thereof which is inserted into the plunger 100. The reason for providing the non-deformable portion 310 having the present structure is to have the upper internal region of the valve housing H and the internal region of the plunger 100 to be as similar in volume to each other as possible.

Described more specifically, when the volume of the internal region of the valve housing H and the volume of the internal region of the plunger 100 are greatly unbalanced with respect to the mounting position of the diaphragm valve body 300, or when either of the two internal regions is too small, the damping performance deteriorates.

The valve housing H structurally has a smaller internal region than the plunger 100. In the exemplary embodiment of the present invention, to compensate for the provided difference in volume between the two internal regions, the non-deformable portion 310 of the diaphragm valve body 300 which is inserted into the plunger 100 is formed to have a predetermined height to increase the volume of the internal region of the valve housing H to an extent corresponding to a height of the non-deformable portion 310. Furthermore, the orifice 310a is formed in the end portion of the non-deformable portion 310 which is inserted into the plunger 100. As a result, it is possible to prevent the aforementioned problem of deterioration in damping performance.

An O-ring member 50, which includes a rubber material, is disposed around an external peripheral surface of the non-deformable portion 310 which is inserted into the plunger 100 to seal the internal region of the plunger 100.

The deformable portion 320 of the diaphragm valve body 300 is formed around the periphery of the non-deformable portion 310 integrally therewith, and is connected to the internal of the valve housing H.

The deformable portion 320 includes an elastic rubber material, like the non-deformable portion 310, and is therefore deformed when the plunger 100 moves up or down, and the non-deformable portion 310 moves up or down simultaneously therewith.

The orifice 310a is formed to penetrate the center of the non-deformable portion 310, through which internal air flows between the internal region of the plunger 100 and the internal region of the valve housing H, and accordingly, a pressure difference is generated therebetween.

A diameter of the orifice 310a is configured wherein, when the plunger 100 moves downwards due to a supply of a voltage to the solenoid 10, the air amount flowing from the internal region of the plunger 100 to the internal region of the valve housing H through the orifice 310a is relatively small in comparison with the downwardly moving speed of the plunger 100, and consequently a pressure difference is generated between the two internal regions.

Now, the operation of the canister close valve device having the above constitutional characteristics when the device is turned ON by the supply of a voltage thereto will be described.

When the canister close valve device is turned ON by the supply of a voltage to the solenoid 10, the plunger 100 and the core 20 are magnetized, and an attractive force is generated therebetween. The plunger 100 is moved downwards toward the core 20 at a high speed by the attractive force. As shown in FIG. 5, while the plunger 100 moves downwards, the air in the plunger 100 flows upwards into the valve housing H through the orifice 310a having the predetermined diameter.

At the present time, because the air amount flowing from the internal region of the plunger 100 to the internal region of the valve housing H through the orifice 310a is relatively small in comparison with the downwardly moving speed of the plunger 100, a pressure difference is generated between the internal region above the diaphragm valve body 300 and the internal region below the diaphragm valve body 300, specifically, the pressure in the valve housing H becomes relatively low and the pressure in the plunger 100 becomes relatively high. The provided pressure difference generates a force that impedes the downward movement of the plunger 100, i.e. The force that acts on the plunger 100 in the upward direction thereof.

Accordingly, the downwardly moving speed of the plunger 100 is reduced at the moment at which the rod 200 connected to the plunger 100, more particularly, a valve member 210 coupled to a lower end portion of the rod 200, reaches the passage P, reducing a collision noise.

Now, the operation of the canister close valve device when the device is switched from the ON state to the OFF state by stopping the supply of a voltage thereto will be described with reference to FIG. 6 and FIG. 7.

When the supply of a voltage to the solenoid 10 is stopped, the attractive force acting on the plunger 100 and the core 20 disappears, and the rod 200 and the plunger 100 connected thereto are moved upwards to their original positions at a high speed by the elastic force of the restoring spring 30.

At the present time, the non-deformable portion 310 and the deformable portion 320 of the diaphragm valve body 300 are moved upwards to their original positions by the upward movement of the plunger 100. Accordingly, the air in the valve housing H flows downwards into the plunger 100 through the orifice 310a.

At the present time, because the air amount flowing from the internal region of the valve housing H to the internal region of the plunger 100 through the orifice 310a is relatively small in comparison with the upwardly moving speed of the plunger 100, a pressure difference is generated between the internal regions above the diaphragm valve body 300 and the internal regions below the diaphragm valve body 300, specifically, the pressure in the valve housing H becomes relatively high and the pressure in the plunger 100 becomes relatively low. The provided pressure difference generates a force that impedes the upward movement of the plunger 100, i.e. The force that acts on the plunger 100 in the downward direction thereof.

Accordingly, the upwardly moving speed of the plunger 100 is reduced at the moment at which the plunger 100 reaches the cap 40, reducing the collision noise.

In conclusion, the force which is generated by the diaphragm valve body 300 to impede the movement of the plunger 100 acts on the plunger 100 shortly before the rod 200 is brought into contact with the passage P, or shortly before the plunger 100 is brought into contact with the cap 40, wherein it is possible to effectively reduce collision noise without affecting the performance of the canister close valve device, including a reaction speed.

Furthermore, when the canister close valve device according to the exemplary embodiment is switched from the ON state to the OFF state, or is switched from the OFF state to the ON state, the force generated by the diaphragm valve body 300 no longer acts on the plunger 100 shortly after the switching operation is completed, wherein it is possible to reduce the collision noise without affecting the sealing performance or the operating voltage of the canister close valve device.

As is apparent from the above description, a canister close valve device according to an exemplary embodiment of the present invention has an effect of reducing a collision noise utilizing an airtight diaphragm structure, which generates a force for impeding movement of a plunger utilizing a pressure difference generated therefrom, in a manner of reducing the downwardly moving speed of the plunger at the moment at which a rod reaches a passage when the device is turned ON, or reducing the upwardly moving speed of the plunger at the moment at which the plunger reaches a cap when the device is turned OFF.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles t of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A canister close valve device configured to open or close a passage mounted between a canister, for collecting evaporation gas evaporated from a fuel tank and an atmosphere, the canister close valve device comprising:
    a plunger configured to selectively move up or down through magnetization with a core inside a valve housing when a solenoid is activated;
    a rod configured to perform a rectilinear reciprocating movement toward or away from the passage according to upward and downward movement of the plunger; and
    a diaphragm valve body inserted into the plunger and connected to the valve housing, the diaphragm valve body being configured to be deformed by the upward and downward movement of the plunger and to generate a force for impeding the upward and downward movement of the plunger utilizing a pressure difference generated between the plunger and the valve housing.

2. The canister close valve device of claim 1, wherein the diaphragm valve body includes:
    a non-deformable portion inserted into the plunger and having a predetermined height to increase a volume of an upper internal region of the valve housing, the non-deformable portion having an orifice formed therein; and
    a deformable portion formed around a periphery of the non-deformable portion integrally therewith and connected to an internal of the valve housing, the deformable portion being configured to be deformed in accordance with an upward and downward movement of the non-deformable portion due to the upward and downward movement of the plunger.

3. The canister close valve device of claim 2, wherein the orifice is formed to penetrate an end portion of the non-deformable portion which is inserted into the plunger.

4. The canister close valve device of claim 2, wherein the diaphragm valve body further includes an O-ring member disposed around an external peripheral surface of the non-deformable portion which is inserted into the plunger.

5. The canister close valve device of claim 2, wherein, when the plunger moves downwards, the diaphragm valve body generates a force for impeding a downward movement of the plunger utilizing a pressure difference by allowing air in the plunger to flow into the valve housing through the orifice.

6. The canister close valve device of claim 2, wherein, when the plunger moves upwards, the diaphragm valve body generates a force for impeding a upward movement of the plunger utilizing a pressure difference by allowing air in the valve housing to flow into the plunger through the orifice.

7. The canister close valve device of claim 1, wherein the diaphragm valve body includes an elastic rubber material.

* * * * *